United States Patent [19]
Voorhees et al.

[11] Patent Number: 5,288,412
[45] Date of Patent: Feb. 22, 1994

[54] GRAY WATER PROCESSING SYSTEM

[76] Inventors: Michael T. Voorhees, 3131 Bell Dr., Boulder, Colo. 80301-2280; Linda M. Brown; Richard F. Schaeff, both c/o Pecos River Learning Center, 1800 Old Pecos Trail, Santa Fe, N. Mex. 87501

[21] Appl. No.: 818,678

[22] Filed: Jan. 9, 1992

[51] Int. Cl.⁵ ............................................. C02F 1/32
[52] U.S. Cl. ................................... 210/739; 210/747; 210/748; 210/134; 210/142; 210/170; 210/192; 210/199; 210/202; 210/257.1; 210/259; 250/435; 250/436; 137/561 A
[58] Field of Search ............... 210/192, 747, 748, 259, 210/260, 266, 199, 202, 257.1, 195.1, 170, 134, 142, 739; 250/435, 436; 137/561 A

[56] References Cited

U.S. PATENT DOCUMENTS

| | | | |
|---|---|---|---|
| 2,384,778 | 9/1945 | Whitman | 250/436 |
| 3,318,449 | 5/1967 | Jennings et al. | 210/104 |
| 3,456,107 | 7/1969 | Robertson | 250/431 |
| 3,543,294 | 11/1970 | Boester | 210/15 |
| 3,630,377 | 12/1971 | Brooks | 210/152 |
| 3,837,800 | 9/1974 | Wood | 250/436 |
| 3,915,857 | 10/1975 | Olson | 210/257 |
| 4,017,734 | 4/1977 | Ross | 250/435 |
| 4,141,686 | 2/1979 | Lewis | 250/436 |
| 4,197,597 | 4/1980 | Toms | 4/300 |
| 4,228,006 | 10/1980 | Hanna | 210/167 |
| 4,255,383 | 3/1981 | Schenck | 250/436 |
| 4,302,338 | 11/1981 | Pfohl et al. | 137/561 A |
| 4,359,789 | 11/1982 | Roberts | 4/300 |
| 4,438,337 | 3/1984 | Forrat | 210/748 |
| 4,471,225 | 9/1984 | Hillman | 250/436 |
| 4,535,247 | 8/1985 | Kurtz | 250/436 |
| 4,615,799 | 10/1986 | Mortensen | 250/436 |
| 4,752,401 | 6/1988 | Bodenstein | 210/760 |
| 4,812,237 | 3/1989 | Cawley et al. | 210/652 |
| 4,828,691 | 5/1989 | Abbott et al. | 210/682 |
| 4,902,411 | 2/1990 | Lin | 210/104 |
| 4,904,387 | 2/1990 | Jordan | 210/605 |
| 4,909,931 | 3/1990 | Bibi | 210/259 |
| 4,968,437 | 11/1990 | Noll | 210/748 |
| 4,969,991 | 11/1990 | Valadez | 210/96.2 |
| 4,983,307 | 11/1991 | Nesathurai | 210/748 |
| 4,986,905 | 1/1991 | White | 210/104 |
| 5,043,079 | 8/1991 | Hallett | 210/748 |
| 5,089,144 | 2/1992 | Ozkahyaoglu et al. | 210/767 |
| 5,147,532 | 9/1992 | Leek, Jr. | 210/182 |

OTHER PUBLICATIONS

"Five Other Water-Saving Strategies", *Sunset Magazine*, May 1991.

*Primary Examiner*—Cynthia L. Nessler
*Attorney, Agent, or Firm*—Cushman, Darby & Cushman

[57] ABSTRACT

A modular gray water processing system is provided comprising a filter, an ultraviolet radiation chamber coupled to the filter and a storage tank for receiving and storing irradiated gray water from the ultraviolet radiation chamber. The filter filters gray water being provided to the gray water processing system and provides the filtered gray water to the ultraviolet radiation chamber. The ultraviolet radiation chamber comprises a plurality of ultraviolet radiation generating modules and a fluid controlling system for directing the gray water entering the ultraviolet radiation chamber to a number of the ultraviolet radiation modules in accordance with the flow rate of the filtered gray water. The irradiated gray water exiting the radiation chamber is directed to the storage tank where it is stored awaiting reuse.

12 Claims, 8 Drawing Sheets

GRAY WATER PROCESSING SYSTEM

FIELD OF THE INVENTION

This invention relates to a modular gray water processing system wherein gray water is filtered, sterilized with ultraviolet light, and stored in a collection tank.

DESCRIPTION OF THE RELATED ART

Due to decreasing water supplies caused by droughts and the increasing development of arid lands in the United States and throughout the world, water conservation has become a growing concern. Many municipalities experience great difficulty in meeting the water needs of their community. Hence, to prevent depletion of their water supply, a significant number of these cities are forced to place restrictions on certain activities such as watering lawns, washing cars, etc.

Under these restrictions, recycling "gray" water that is drained from showers, sinks, bathtubs, washing machines and the like, excluding toilets, for non-potable water use is desirable. Unfortunately, the use of untreated recycled gray water poses certain concerns, as described in "5 Other Water Saving Strategies," *Sunset Magazine*, May 1991, pages 116-118. For example, since gray water is water that has already been used in some cleaning process (i.e. bathing, showering, etc.), it typically contains bacteria, soaps, toothpaste and other wastes associated with these daily functions. Hence, reuse of gray water for lawn watering, for example, can result in humans and animals coming in contact with these wastes and bacteria.

Sprinkling untreated gray water, for example, can render the bacteria both air-borne and soil-borne. Also, some municipalities prohibit storage of untreated gray water since the storage facilities encourage growth of the bacteria present in the gray water. Treating the gray water with persistent chemicals, such as Chlorine, before it is stored would pose additional problems. For example, soaps that are typically present in gray water often contain sodium. Hence, chlorine added to the gray water for purification purposes can react with the sodium to form salts. When spread on the lawn during watering, these salts can destroy the grass, plants, etc. and can also kill beneficial organisms present in the soil.

Roberts, U.S. Pat. No. 4,359,789, recognizes that gray water collected from sinks, bathtubs, etc. of a residence may be purified before it is stored in a reservoir for later use to irrigate, water animals, of for return to ponds, lakes or streams. Roberts, however, does not disclose any method or apparatus for purifying that gray water.

One conventional apparatus for purifying water is an activated charcoal filter 100 as shown in attached FIG. 7. Such conventional charcoal filters are commonly used to remove odor and chemicals, such as chlorine from potable drinking water, and may comprise cloth mesh portions 102 and an activated carbon portion 104. With these filters, when water passes through the cloth mesh portion 102 and activated carbon portion 104, solid pollutants are removed. Activated charcoal filters, however, do not kill bacteria that may be present in the water. In fact, these charcoal filters can act as a breeding ground for bacteria if not replaced frequently. Thus, the use of a conventional charcoal filter to treat gray water will not prevent bacterial buildup during later storage of the gray water.

The use of ultraviolet radiation to kill bacteria present in water is disclosed in Noll, U.S. Pat. No. 4,968,437.

Noll discloses a fluid purification system which is specifically designed for domestic use and which utilizes filters and UV tubes to process an undisclosed source of water into high-quality, potable drinking water. Noll further discloses a number of different configurations in which the UV sections and filter sections may be arranged, such as, for example, FIGS. 5-7 of in which sterilizer sections are indicated by 21 and filter sections are indicated by 22. In most embodiments of Noll, the fluid-carrying conduit is spirally wound around the UV source to create a turbulent flow of water in the vicinity of the UV source. In the embodiment of FIGS. 11-13, however, the UV bulb 26 is surrounded by a cylindrically-shaped jacket 43 which is divided into two separate half-jackets 44 and 45. Within the half-jackets, baffles 46 are placed to cause the gray water passing through the jacket to enter a turbulent state. Noll requires that the fluid be exposed to ultraviolet radiation prior to filtration and exposed to radiation again after the filtration.

The Noll system is impractical for treating gray water for several reasons. First, since gray water contains many solid pollutants such as soap and toothpaste, these pollutants will undoubtedly adhere to the portions of the pipe surrounding the ultraviolet tube which carry the water that has not yet passed through the filter. Hence, a buildup of these pollutants on the inner surface of the pipe will block the ultraviolet radiation and thus the water passing through these sections of pipe will not adequately be irradiated. In addition, the buildup would require the UV chamber to be frequently cleaned, and yet, the shapes of the water carrying conduits in Noll (spiralling around the UV bulb or interspersed with baffles) are not conducive to cleaning. Accordingly, the Noll system is inappropriate for domestic gray water treatment.

Other U.S. patents disclose various water purification systems. For example, NESATHURAI, U.S. Pat. No. 4,983,307 discloses a UV sterilizer comprising a conduit 21 within which an elongated uv bulb 23 is placed. Hydroponic nutrient solution is then pumped through the housing 21, in contact with the UV bulb 23, to irradiate the water and eliminate fungi and algae. Nesathurai discloses that the bulb may be encased in a jacket which is factory sealed to the UV bulb.

Nesathurai discloses intimate contact between the water and the bulb and thus suffers from the disadvantage that the water temperature must be regulated, as described in column 6 of Nesathurai, to prevent rapid temperature changes from bursting the UV bulb. This apparatus is unacceptable for a gray water processing system since the gray water processing system may be receiving, in immediate succession, cold tap water from, for example, the kitchen sinks, and hot water from, for example, the clothes washer.

General water purifiers such as in Noll and Nesathurai also fail to accommodate an important factor in gray water purification systems, namely that the flow rate of gray water varies greatly throughout the day. To be effective, Noll and Nesathurai must estimate the maximum anticipated water flow and choose a UV bulb sufficiently large to sterilize that maximum flow. Then, even if the actual water flow falls below the expected maximum, the UV bulb will be constantly activated in anticipation of the maximum flow scenario. Thus, Noll and Nesathurai are inefficient in situations where the water flow is highly variable, such as in domestic gray water purifiers. With gray water for instance, during the morning hours when perhaps several family members are preparing for work or school, the showers and sinks may be used extensively, thus creating a large volume of gray water. At various times of the day when the washing machine is running, gray water production is also high. At other times, however, no gray water sources may be operating and thus no gray water is produced; or only one or two sinks may be operating thereby providing only a slight amount of gray water. Hence, if a system capable of processing a large amount of gray water is fully activated even when a negligible amount of gray water is produced, much energy is wasted. Furthermore, the life of the ultraviolet tube due to such frequent use is greatly reduced.

Therefore, a system is needed which is capable of effectively using ultraviolet radiation to purify gray water in the domestic environment. The system should also control, in proportion to the flow rate, the amount of energy that is expended in processing the gray water. Furthermore, the system should be easily maintainable at minimal cost.

SUMMARY OF THE INVENTION

An object of the present invention is to provide a modular gray water processing system which utilizes ultraviolet radiation to render organic contaminants biologically inert from gray water and operates in accordance with and responsive to the gray water flow rate. Another object of the invention is to provide a modular gray water processing system having ultraviolet radiation generating components that are easily accessible thus allowing the system to be easily maintained at a minimal cost.

The gray water processing system according to an embodiment of the present invention comprises the combination of a filter for filtering gray water received by the system, an ultraviolet radiation chamber, coupled to the filter, for irradiating the filtered gray water and a reservoir for storing the irradiated gray water. The ultraviolet radiation chamber is further defined as comprising a plurality of ultraviolet radiation generating modules, each comprising a hollow outer tube, a hollow inner tube disposed within the hollow outer tube and an ultraviolet radiation generating tube removably sealed within the hollow inner tube. The filtered gray water passes through the space formed between the outer surface of the inner tube and the inner surface of the outer tube. The inner tube is made of a material transparent to ultraviolet radiation thus permitting the ultraviolet radiation to pass through the inner tube and irradiate the gray water. The inner surface of the hollow outer tube is lined with a material which reflects the ultraviolet radiation back into the water thus more efficiently irradiating the water.

The UV modules are designed for easy cleaning as would be required following its use in processing, specifically, gray water. In one present embodiment, UV modules are each about 18 inches long, which can be easily handled by those using the gray water processing system in the domestic environment. The modules have a top cap which can be unscrewed to allow the interior sheath to be removed from the outer pipe so that the surfaces of both the inner pipe and the outer pipe may be cleaned by a simple wiping.

Each ultraviolet radiation generating module further comprises a switch for activating the ultraviolet radiation generating tube when gray water passes through that particular module. The ultraviolet radiation chamber further comprises a fluid controlling system for directing the gray water to a number of the ultraviolet radiation generating modules in accordance with the rate of flow of the gray water. Hence, the number of modules that receive the gray water at any one time is controlled based on the volume of gray water currently being provided to the system.

Furthermore, a pump irrigation system or the like may be coupled to the reservoir to transport the irradiated gray water to a sprinkler system or the like thereby returning purified gray water to the environment.

In accordance with these and other objects, the invention is described in detail below with particular reference to the accompanying drawings.

BRIEF DESCRIPTION OF THE DRAWINGS

FIGS. 1-8 illustrate a gray water processing system of the present invention. Like numerals and characters identify identical items throughout the figures.

FIG. 1 illustrates a gray water processing system of the present invention used in a residential application.

FIG. 2 illustrates a complete ultraviolet radiation producing module of FIG. 1.

FIG. 3a is a cut-away view taken along the plane M—M in FIG. 3b.

FIG. 5a is a cut-away view taken along the plan N—N in FIG. 5b.

FIG. 6 illustrates a fluid controlling system as used by the present invention.

FIG. 7 (Prior Art) illustrates a typical carbon filter as used in the filter of the present invention.

FIG. 8 (Prior Art) illustrates a typical storage tank as used in the present invention.

DETAILED DESCRIPTION OF THE PRESENTLY PREFERRED EMBODIMENTS

Figure 1:
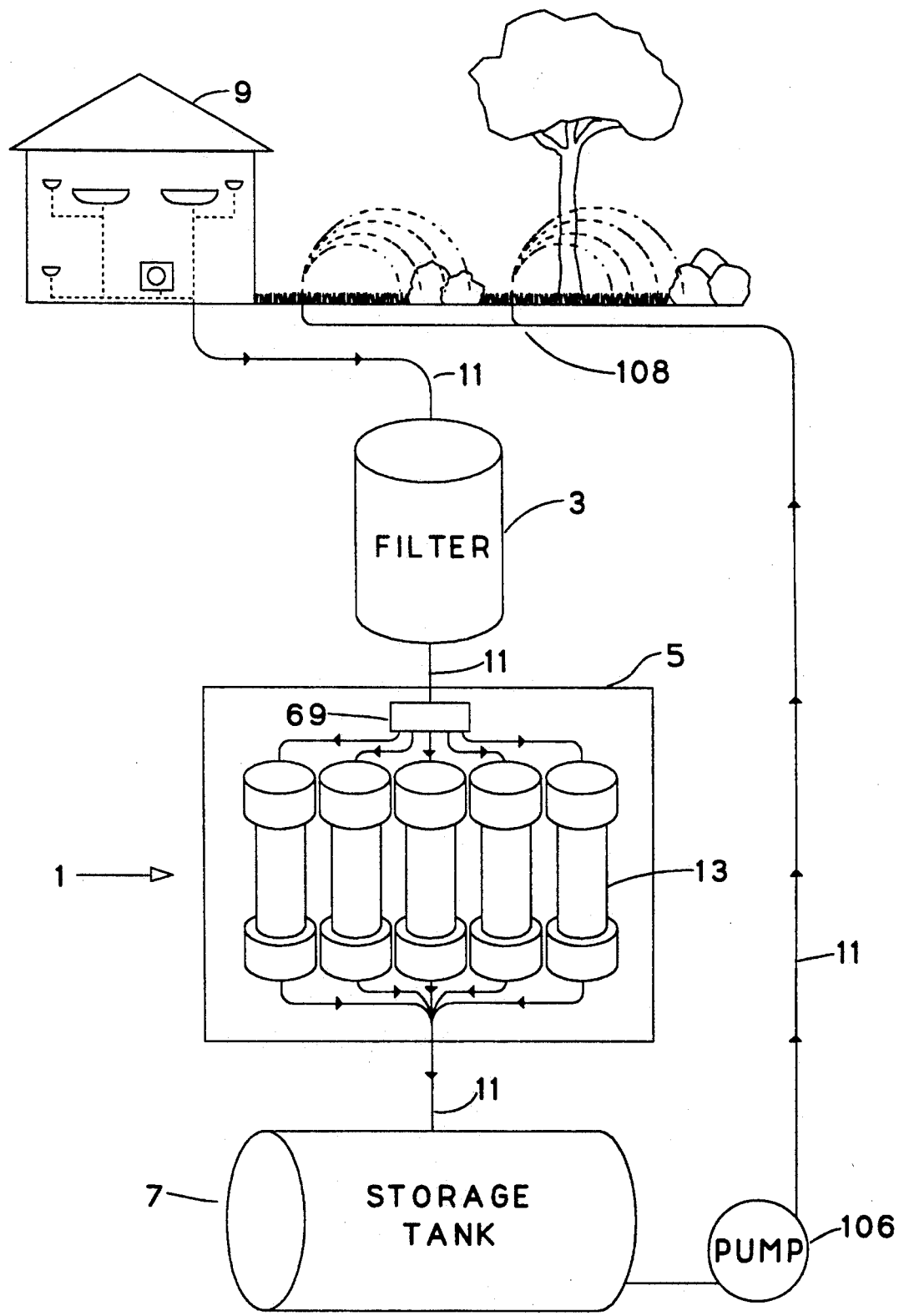

FIG. 1 illustrates a gray water processing system 1 as provided by the present invention. The gray water processing system 1 comprises a filter 3, an ultraviolet radiation chamber 5 coupled to the filter 3 and a storage tank 7. The gray water processing system 1 receives into the filter 3 gray water from sinks, bathtubs, showers, washing machines or the like of a residence 9. The filter 3 comprises a typical charcoal filter 100 or the like and filters large particles from sources such as soap, toothpaste or the like from the gray water received by the gray water processing system 1 and provides this filtered water to the ultraviolet radiation chamber 5 via conventional plumbing 11.

The ultraviolet radiation chamber 5 comprises a plurality of individual ultraviolet radiation generating modules 13 and a fluid controlling system 69. The fluid controlling system 69 receives filtered water from the filter 3, divides the filtered water into a plurality of discrete water flows, and provides the filtered water to the plurality of modules 13. The fluid controlling system 69 is described more specifically below, with respect to FIG. 6.

The modules 13 are designed with a capacity to sterilize a predetermined volume of water over time, such as one gallon per minute per module. With this arrangement, only those modules needed to sterilize an incoming volume of gray water at any given time need be activated. The fluid controlling system 69 then provides those modules with water in accordance with their respective water sterilizing capacities. Thus, for example, if the filter 3 outputs a total volume of 10 gallons per minute and the modules 13 have capacities of one gallon per minute each, the fluid controlling system 69 would accept the 10 gallons per minute from the filter 3, divide the 10 gallons per minute into 10 discrete flows of one gallon per minute each, and provide the 10 one gallon per minute flows to each of 10 respective modules 13, the 10 respective modules 13 therefore providing an aggregate capacity of 10 gallons, equalling the total volume of filtered gray water to be treated per minute. The ultraviolet radiation generating modules 13 are described in greater detail below, with respect to FIGS. 2-5b.

After the water leaves the ultraviolet radiation generating modules 13, it enters a storage tank 7, where it remains until it is drawn via a pump 106 into, for example, a sprinkler system 108 for use in irrigating lawns, or other nonpotable uses.

Figure 2:
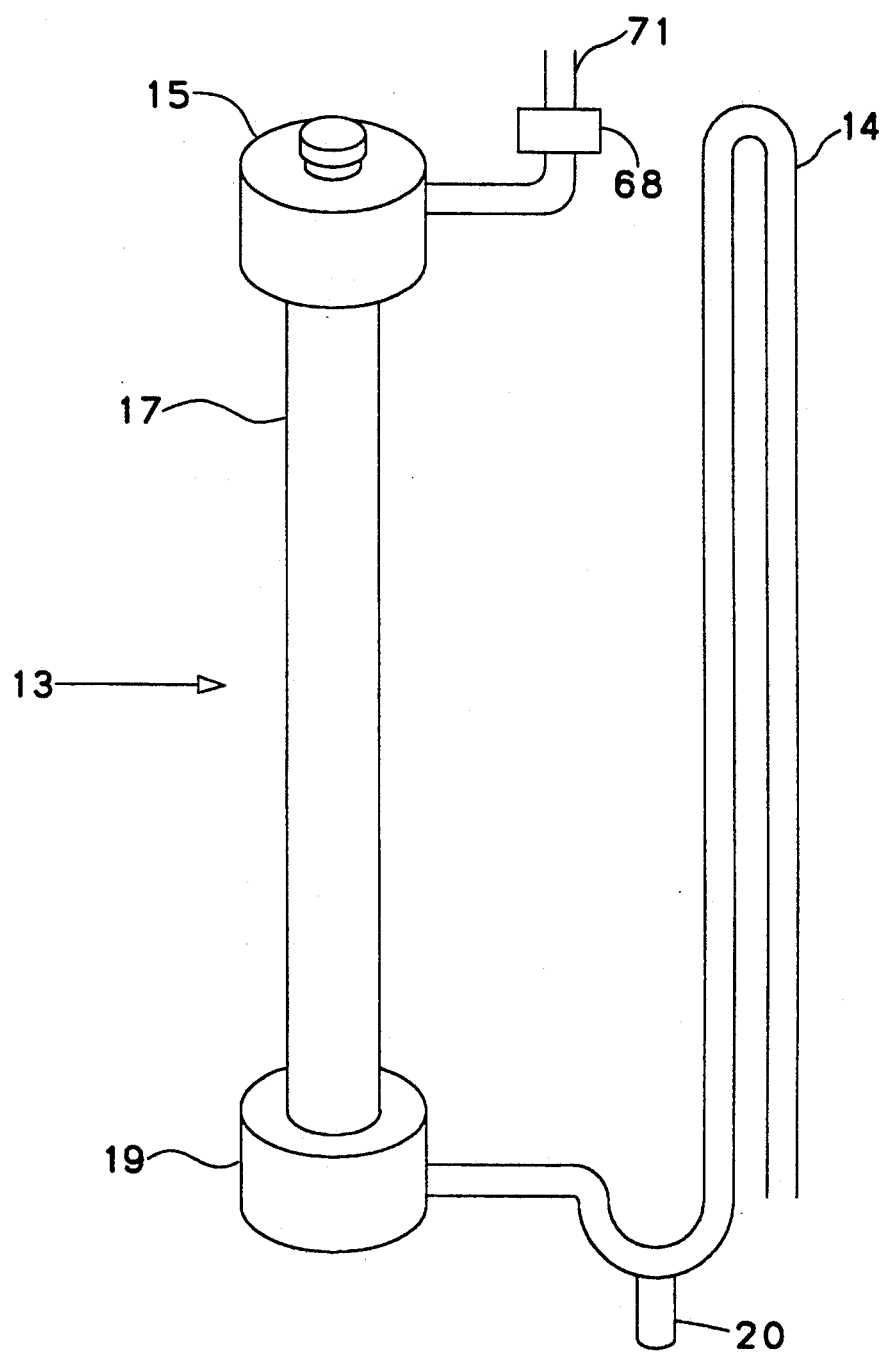

The modules are shown in detail in FIGS. 2-5b. As shown in FIG. 2, each ultraviolet radiation generating module 13 comprises a top ring inflow assembly 15, an UV tube holding portion 17, and a base ring outflow assembly 19. Attached to the top ring inflow assembly 15 is a pipe 71 from the fluid controlling system 69 (FIG. 6) with an optional shut-off valve 68. Attached to the base ring outflow assembly 19 is a U-tube 14 including a drain 20. The top ring inflow assembly 15 is further illustrated in FIGS. 3a and 3b.

Figure 3A:
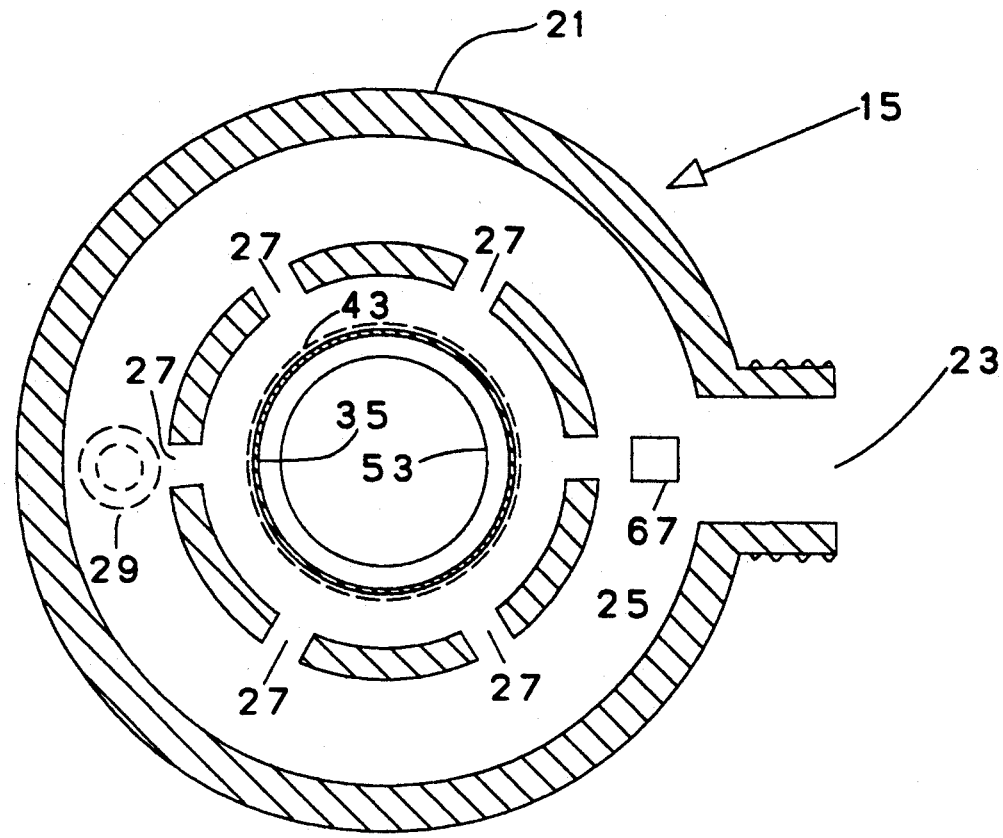
FIGS. 3a and 3b illustrate a cross sectional view and side view, respectively, of a top ring inflow assembly of the ultraviolet radiation producing module of FIG. 2.

As shown in FIG. 3a, the top ring inflow assembly 15 comprises a top ring distribution cap 21 having a large inflow port 23 and a flow distribution ring 25. Filtered gray water flows through the large inflow port 23 and into the flow distribution ring 25. The flow distribution ring 25 communicates with a plurality of small inflow ports 27 disposed about an inner portion of the top ring distribution cap thus enabling the water in the flow distribution ring 25 to flow through the small inflow ports 27. A gas release valve 29 is disposed on the top surface of the top ring inflow assembly 15 and communicates with the flow distribution ring 25 to permit gases which may accumulate in the flow distribution ring 25 to escape. The gas release valve 29 comprises a gas release valve float 31 (FIG. 3b) to regulate the flow of gases out of the flow distribution ring 25.

Figure 3B:
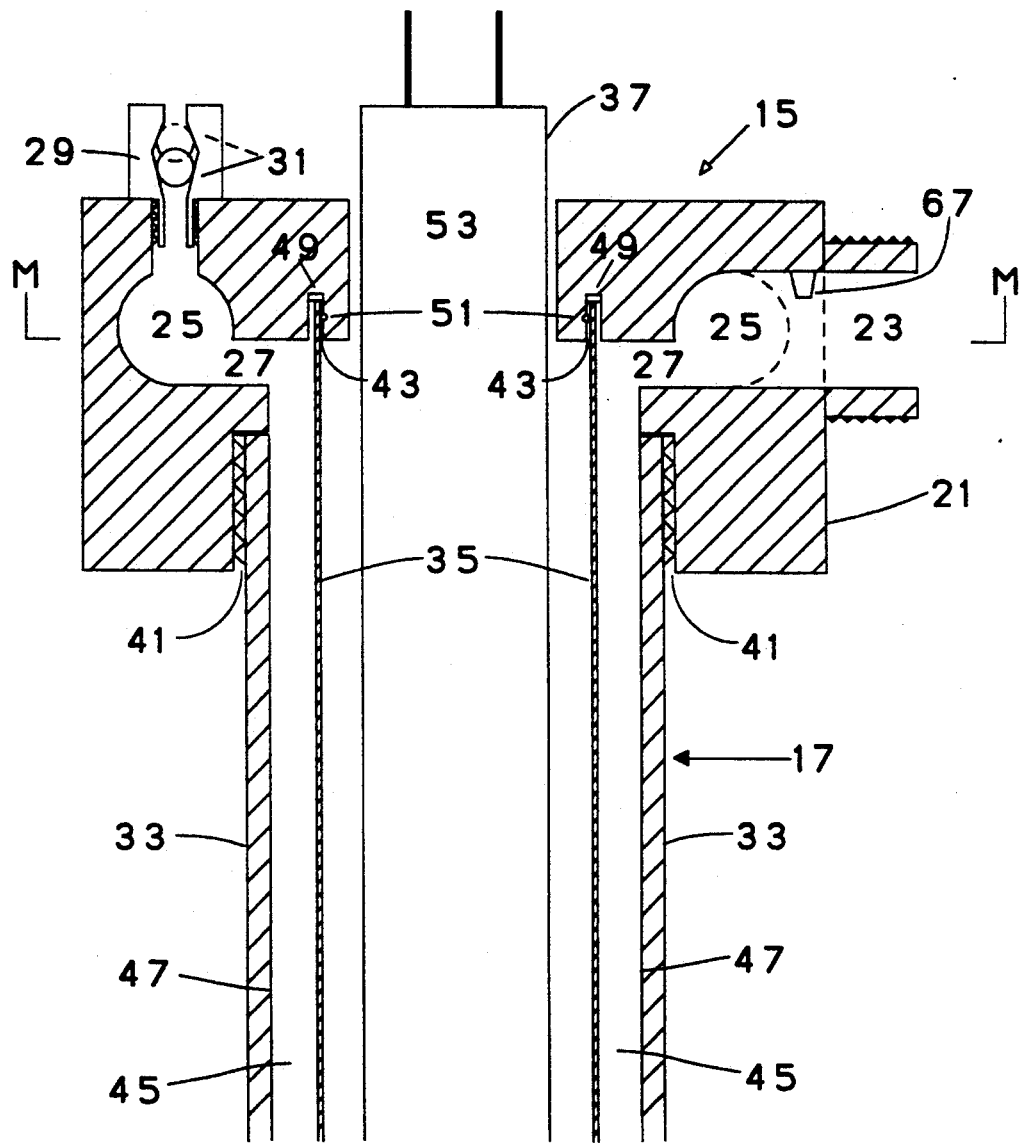

The top ring distribution cap 21 is secured to one end of the UV tube holding portion 17, as shown in FIG. 3b. The UV tube holding portion 17 comprises an outer pipe 33 and an inner pipe 35 having an outer diameter smaller than the outer pipe 33 such that the inner pipe 35 is disposed within the outer pipe 33. The inner pipe 35 extends lengthwise beyond the ends of the outer pipe 33, as shown in FIG. 3b. The inner pipe 35 is made of a material such as clear fused silica or the like which is transparent to ultraviolet radiation. The outer pipe 33 is made of PVC or a similar conventional material, with the inner surface 47 of the outer pipe 33 coated with polished alzac aluminum or the like to reflect ultraviolet radiation. Alternatively, the outer pipe 33 may be entirely polished alzac aluminum. An ultraviolet radiation generating mercury bulb 37 is disposed radially within the inner pipe 35 and extends through a bulb opening 53 in the top ring inflow assembly 15.

The top ring distribution cap 21 is secured to the outer pipe 33 via threads 41 and is sealed to the inner pipe 35 via a pipe groove 43 containing a rubber washer 49 and rubber O-ring 51. The threads 41 provide a waterproof seal between the top ring inflow assembly and the outer pipe. The washer 49 and O-ring 51 provide a waterproof seal between the top ring inflow assembly and the inner pipe 35. A flow passage 45, which is in communication with the flow distribution ring 25 via the small inflow ports 27, is created in the space between the inner pipe 35 and the outer pipe 33.

Water thus enters the top ring inflow assembly 15 through the large inflow port 23, moves through the flow distribution ring 25, through the small inflow ports 27, and into the flow passage 45. Within the flow passage, the water is illuminated by ultraviolet light coming from the UV bulb 37 through the transparent inner wall 35 and by reflected ultraviolet light coming from the reflective outer pipe 33. Importantly, throughout the entire module, no water comes into direct contact with UV bulb 37. The UV bulb 37 thus will have less risk of bursting as a result of drastic gray water temperature changes, and will need not to be sealed water-tight to the top ring inflow assembly 15, thus permitting the bulb to be easily removed and replaced.

Each ultraviolet radiation generating module 13 further comprises a water sensing device 67 (FIG. 3b) to detect the presence of water entering the UV module. The water sensing device 67 provides a signal to circuitry (not shown) within the ultraviolet radiation chamber 5 to activate the mercury bulb 37. Hence, the mercury bulb 37 of a particular module 13 is only energized when gray water is flowing through that module, thus conserving energy in the system. In FIG. 3b, the sensing device 67 is shown in the inflow port 23, but the device 67 may be located anywhere in the flow passage 45 or in the U-tube 14. The sensing device 67 may be any conventional sensing device including but not limited to a float in the U-tube 14 to sense water flowing through the U-tube, or may be an impeller to sense water flow in the port 23, the flow passage 45, or the U-tube 14.

Figure 4B:
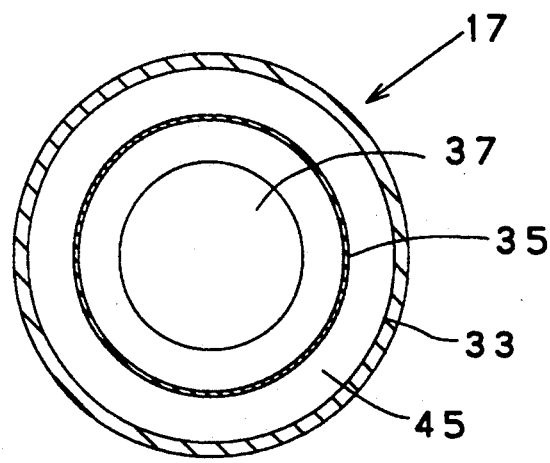
FIGS. 4a and 4b illustrate a side view and cross sectional view, respectively, of an ultraviolet radiation producing tube holding portion of an ultraviolet radiation producing module of FIG. 2.
Figure 4B:
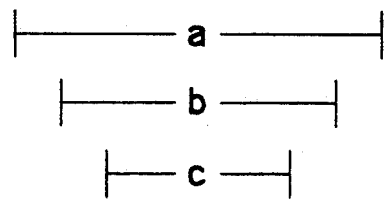
Figure 4A:
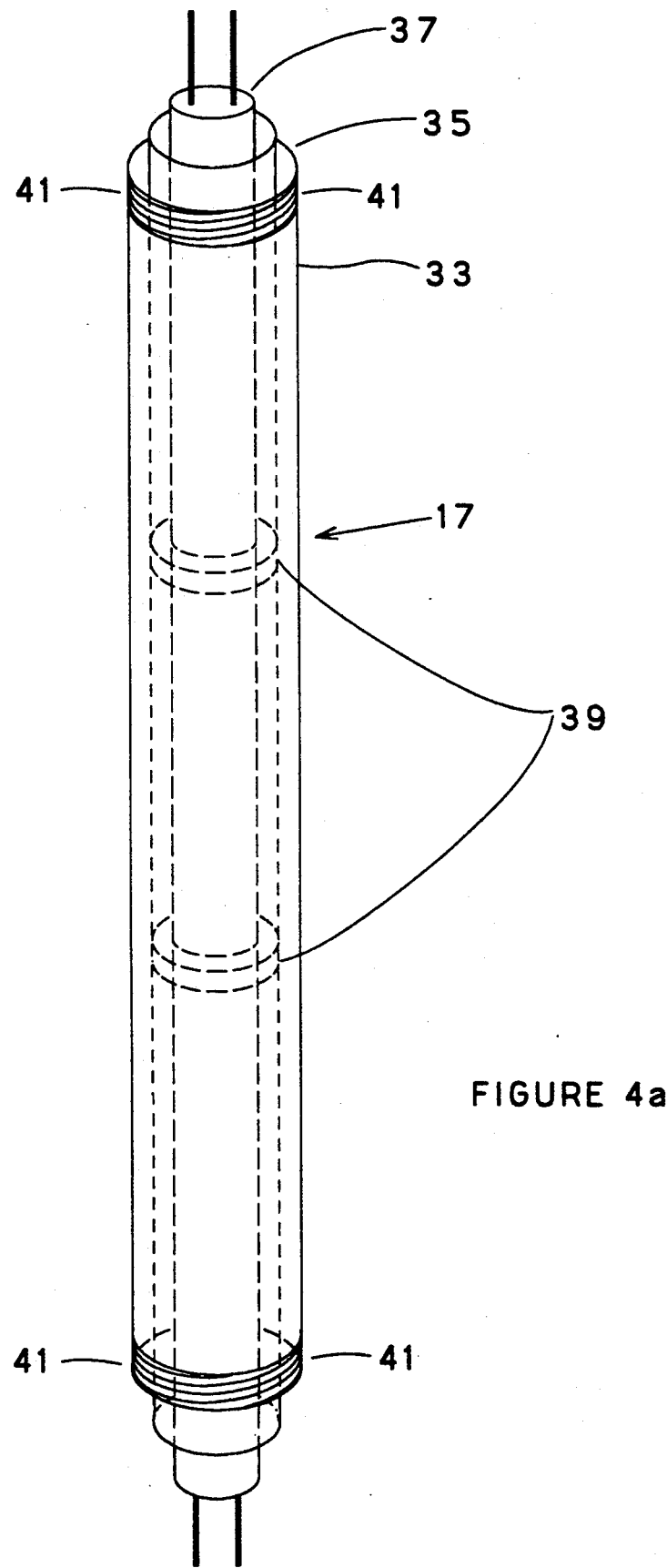

The complete UV tube holding portion 17 is shown in FIG. 4a, including the outer pipe 33 and the inner pipe 35. Bulb separator rings 39 may be provided to support the bulb 37 and hold it away from the inner surface of the inner pipe 35.

A cross sectional view of the UV tube holding portion 17 is shown in FIG. 4b. Although the dimensions may vary greatly, in the presently preferred embodiment, "a" in FIG. 4b is approximately 2 inches, "b" is approximately 1.5 inches and "c", is approximately 1 inch.

Figure 5A:
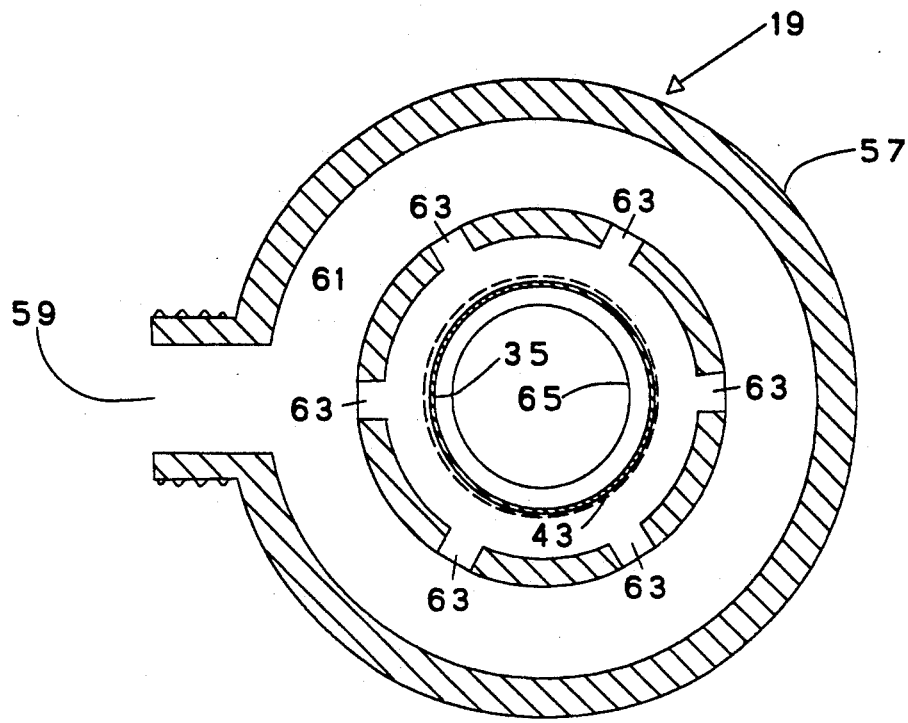
FIGS. 5a and 5b illustrate a cross sectional view and side view, respectively, of a base ring outflow assembly of the ultraviolet radiation producing module of FIG. 2.
Figure 5B:
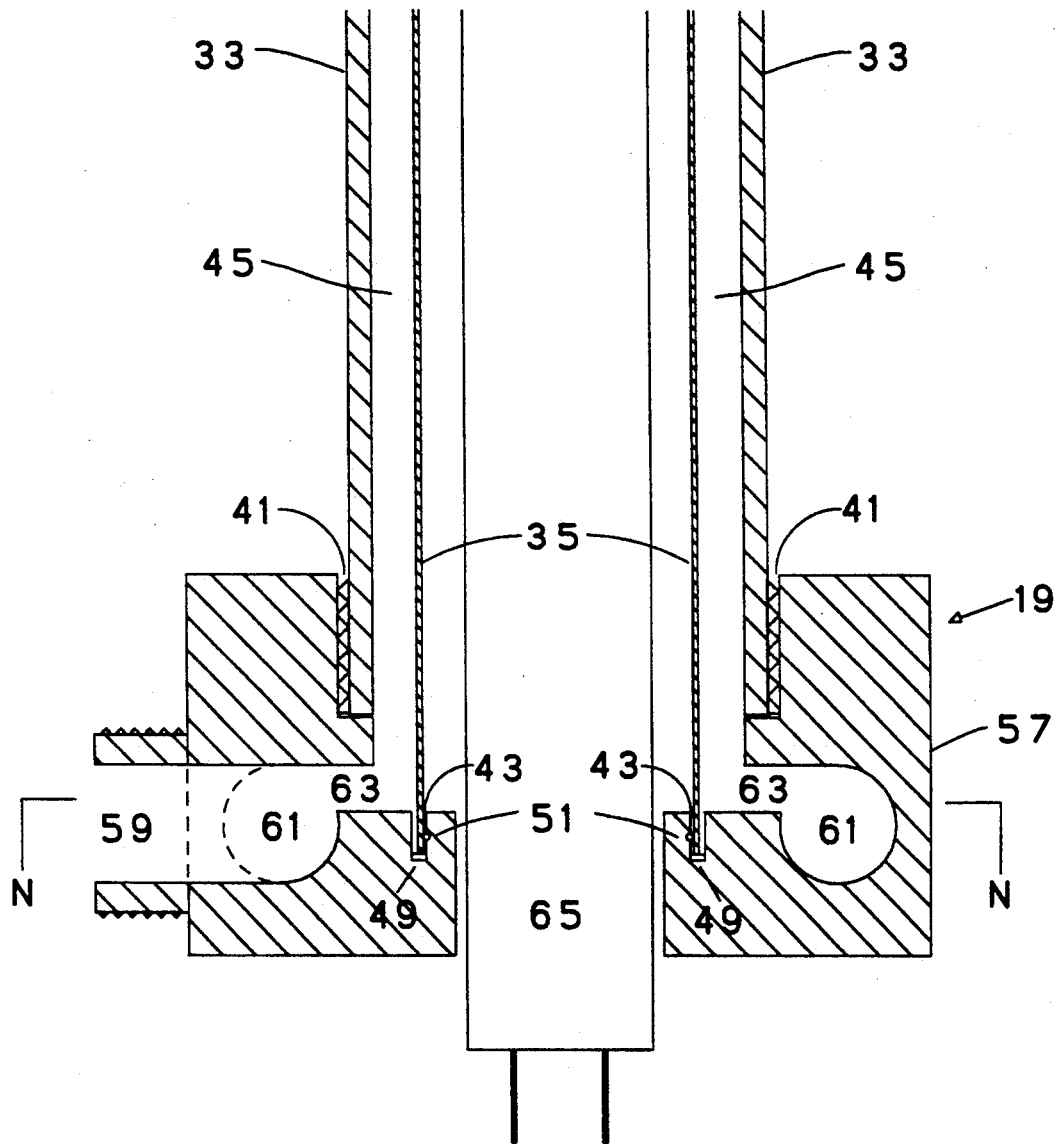

In the module 13, opposite the top ring inflow assembly 15 is a base ring outflow assembly 19, shown in FIGS. 2, 5a and 5b. Like the top ring inflow assembly, the base ring outflow assembly 19 also has threaded grooves 41 present at an inner surface (FIGS. 5a and 5b). Thus, the outer pipe 33 and base ring outflow assembly 15 are securely screwed together at their respective threaded grooves 41. Similarly, the groove 43 in the base ring outflow assembly 19 seals to the inner pipe 35 via washer 49 and rubber O-ring 51.

The base ring outflow assembly 19 further comprises a base ring distribution cap 57 having a large outflow port 59 and a flow distribution ring 61., The flow distribution ring 61 communicates with a plurality of small outflow ports 63 disposed about an inner portion of the base ring distribution cap 57. The small outflow ports 63 further communicate with the flow passage 45. Hence, the gray water flowing though the flow passage 45 flows through the small outflow ports 63 into the flow distribution ring 61 and further through the large outflow port 59 into the U-tube 14 (FIG. 2).

As in the top ring distribution cap 21, the inner pipe groove 43 of the base ring distribution cap 57, containing the rubber washer 49 and rubber O-ring 51 provide a waterproof seal between the base ring distribution cap 57 and the inner pipe 35 (FIG. 5b). Also, the threads 41 provide a waterproof seal between the base ring distribution cap 57 and the outer pipe 33. The mercury bulb 37 then extends through the bulb opening 65 in the center of the base ring outflow assembly 19. With this assembly, the bulb 37 is completely out of contact with the gray water and can be easily removed from the assembly and replaced, without exposing any water-carrying conduits, such as passage 45. Further, the top ring inflow assembly 15 and the base ring outflow assembly 19 can be easily unscrewed from the outer pipe 33, allowing the user to easily remove the inner sheath 35 from the outer pipe 33 to clean the outer pipe and inner sheath. As discussed above, this cleaning ability is most important in gray water processors since residual elements in the gray water, such as soap, can coat the surfaces of the water-carrying conduits and thereby reduce UV transmissivity.

Before cleaning, the spigot-type valve 68 (FIG. 2) can be used to temporarily restrict the flow of gray water to the associated module 13 when that module is being cleaned. Furthermore, the drain valve 20 that is disposed in the lower curved portion of U-tube 14 proximate to the base ring outflow assembly 19 can be used to purge residual gray water from the module 13 before the module 13 is cleaned.

To achieve effective sterilization at a one gallon per minute flow rate per module, the following module specifications may be used. General Electric UV bulb model G25T8, having a 25 watt (nominal) output, a source length of 14 inches, and a predominant wavelength of 2537 Angstroms, may be used. This will provide an average output of 4 watts, or 0.268 watts (UV) per inch of source. With the length of the source being 14 inches and the circumference of the inner surface of the outer pipe being 6.283 inches, the total inner surface is 87.965 square inches. Using this area, the UV bulb will provide 0.046 watts per square inch, or 7000 micro watts per square centimeter. With the inner diameter of the outer pipe 33 being 2 inches and the outer diameter of the inner pipe 35 being 1.5 inches, the resultant cross section between the inner and the outer pipe is 1.375 square inches. At a water velocity of 2.8 inches per second (calculated using one gallon per minute, or 3.85 cubic inches per second, divided by the cross section of 1.375 square inches), a dose of 35,000 micro watt-sec. per square cm at a depth of 0.64 cm is achieved. Assuming a composite transmissivity of at least 95% for clear fused silica, the dose is reduced to 33,250 micro watt-sec. per square cm. This dose is sufficient to kill most bacteria, including *E. coli*, Shigella, *S. Typhosa*, *Streptococcus faecalis*, *B. subtilus*, and *B. subtilus* spores, and to inactivate viruses such as polio, ECHO 7, and Coxsackie.

Figure 6:
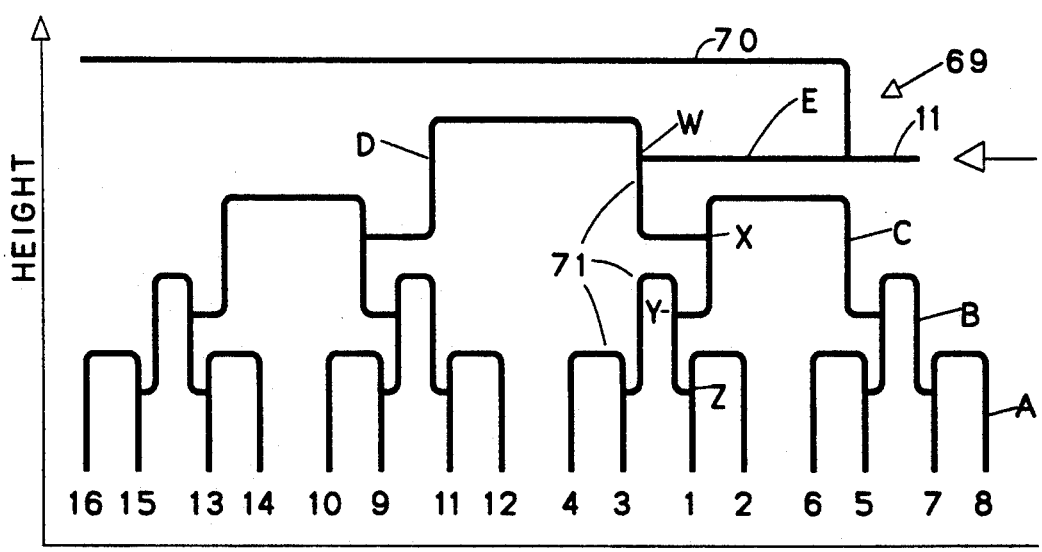

FIG. 6 shows the fluid controlling system 69 which feeds filtered water to the respective modules. Although any system which can divide an incoming water flow into predetermined smaller flows may be used, the following embodiment includes only inexpensive passive parts and is thus particularly suited to the domestic environment where higher expenses may render the system prohibitively costly.

The fluid controlling system 69 in FIG. 6 comprises a plurality of pipes 71 arranged in a branch-type fashion stemming from the plumbing 11, following the filter 3 (FIG. 1). As shown in FIG. 6, the pipes 71 are arranged in a particular vertical pattern, with the height of the pipes shown on the y-axis of FIG. 6. The water from the filter 3 enters the pipes 71, proceeds past point E, and branches at point W. If the gray water flow is small enough that only one module is needed to sufficiently sterilize the passing water, all of the gray water will flow downward (relative to FIG. 6) at point W, until it intersects point X where it will again flow downward toward point Y. Similarly, at points Y and Z, the small volume of gray water will flow downward until it reaches Module "1" at the base of FIG. 6. Sensing device 67 in Module "1" will then sense the water flow and activate the UV bulb in Module "1", thereby sterilizing the passing gray water.

Now, since each module has particular dimensions (described above) that give it a specific water handling capacity, as the volume of gray water increases beyond the capacity of Module "1", the gray water will back up at point Z until the water pressure forces some gray water upwardly at point Z (over the "hill" in the piping at point Z) into Module "2". Module "2" will then sense a water flow and will be activated to sterilize its passing gray water. Continuing this analysis for each of the pipe intersections, such as W, X, Y and Z, in the entire pipe structure 71 of FIG. 6 will demonstrate that the modules at the base of FIG. 6 will activate, one after another, in numerical order, as the gray water flow rate increases.

For example, if a maximum desired flow rate of gray water through each ultraviolet radiation generating module 13 is 1 gallon/minute and the filtered gray water is entering the ultraviolet radiation chamber 5 at a rate of 5 gallons/minute, the fluid controlling system 69 directs the filtered gray water equally to the first five ultraviolet radiation generating modules 13. Hence, the desired rate of 1 gallon/minute is attained for each of the first 5 ultraviolet radiation generating modules 13. Furthermore, only the water sensing devices 67 in those selected 5 ultraviolet radiation generating modules 13 will sense the presence or flow of water and, therefore, the mercury bulbs 37 in only those 5 modules will activate, thus conserving energy and bulb life.

For modules accommodating 1 gallon/minute/module and for typical domestic gray water plumbing, the pipe diameters in FIG. 6 may be: A (0.66 inches), B (0.94 inches), C (1.32 inches), D (1.87 inches), and E (2.65 inches). Further, 1–2 inch upturns at all intersections in FIG. 6, such as exemplary intersections denoted W, X, Y and Z in FIG. 6, will suffice to direct the gray water toward the appropriate modules, in the manner described above, given typical gray water pressures in the domestic environment. Of course, the present invention is not limited to the particular dimensions and construction of the pipes, the number of modules, the dimensions of the modules or the preassigned flow rates per module described above, but may vary widely depending on a particular application.

In an alternative embodiment, an outlet 70 is provided in the pipe structure 71 before intersection W as shown in FIG. 6. The outlet may connect to a sewer or septic, as an emergency overflow port to accommodate gray water when the gray water flow rate exceeds the sum capabilities of all of the modules provided.

To prevent water from initially rushing too quickly through any particular module, the module and a portion of the U-tube 14 remain filled with sterilized water after the module is deactivated (i.e., when gray water ceases flowing into the module). This provides some resistance to any initial rush of water, ensuring that the initial flow of water encounters the UV radiation for a sufficiently long period of time to effectively sterilize it.

To ensure that the water remaining in the module after the gray water ceases flowing through it is fully sterilized, deactivation of the UV bulb in the module may be delayed for a period of time after the flow stops.

Figure 8:
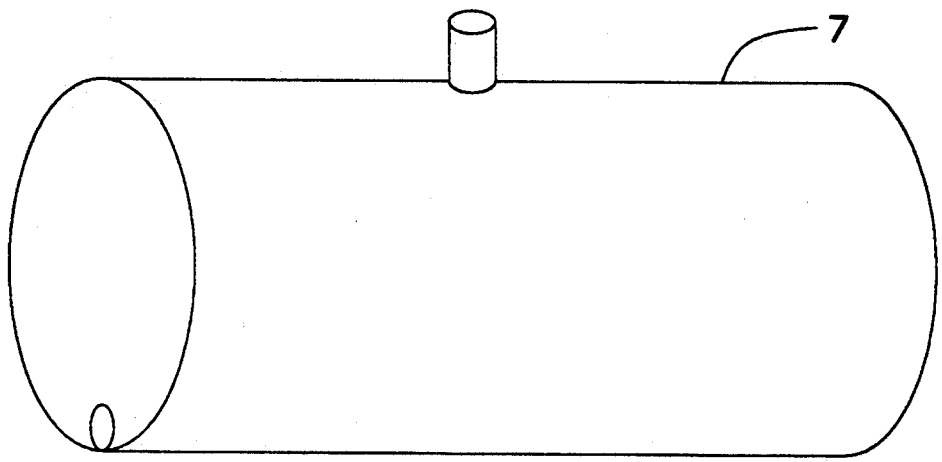
Figure 7:
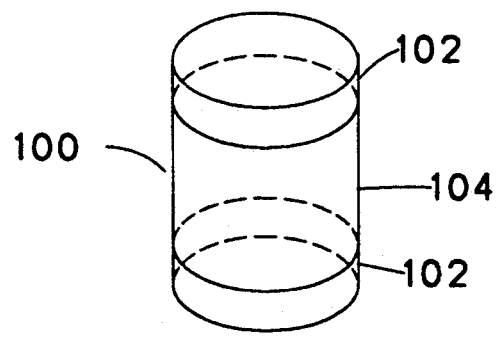

Finally, upon exiting the large outflow port 59 of each of the ultraviolet radiation generating modules 13, the irradiated gray water is directed via standard plumbing 11 to a storage tank 7 as illustrated in FIG. 8. The storage tank 7 is made of conventional material such as polyethylene or the like. As shown in FIG. 1, a pumping unit 106 can be coupled to the storage tank 7 to pump the irradiated gray water to a sprinkler system 108 thus returning the gray water, absent the harmful pollutants and bacteria, back to the environment.

Although the preferred embodiment of this invention has been described, it will be obvious to those skilled in the art that various changes and modifications may be made therein without departing from the invention. Therefore, the claims are intended to include all such changes and modifications that fall within the spirit and scope of the invention.

What is claimed is:

1. A method for processing gray water, comprising the combination of steps of:
   collecting gray water;
   passing the collected gray water through a filter, the filtered gray water having a total volume;
   dividing the filtered gray water into discrete flows of predetermined rates;
   passing each of the discrete flows of filtered gray water respectively through a plurality of modules, each of said modules having a capacity corresponding to the volume of one of the discrete flows, wherein said discrete flows are passed to a first module until said first module receives one of said discrete flows of said filtered gray water equal to said capacity before the next sequential module receives one of said discrete flows, and wherein said discrete flows are passed only through a number of said modules whose aggregate capacity substantially equals said total volume;
   irradiating each of said discrete flows of filtered gray water with ultraviolet radiation respectively in each of the modules to obtain filtered and irradiated gray water.

2. The method for processing gray water as in claim 1, further including the step of:
   storing the irradiated gray water in a storage tank.

3. The method for processing gray water as in claim 1, further including the step of:
   after the step of passing each of the discrete flows, detecting one of the discrete flows in each of the modules; and
   before the step of irradiating, activating ultraviolet radiation sources only in each of the modules detecting one of the discrete flows.

4. The method for processing gray water as in claim 1, further comprising the step of:
   utilizing the irradiated gray water for agricultural irrigation.

5. The method for processing gray water as in claim 1, further comprising the step of:
   utilizing the irradiated gray water as a primary water source for a toilet.

6. A gray water processing system comprising the combination of:
   means for filtering a source of gray water, means for supplying said gray water to said gray water processing system said gray water being supplied to said gray water processing system and for outputting a flow of filtered gray water, said filtered gray water having a total volume; and
   means for irradiating said filtered gray water with ultraviolet radiation and for outputting irradiated gray water, said irradiating means comprising:
   a plurality of module means for receiving at least a portion of said flow of said filtered gray water, each of said module means having a capacity to irradiate a predetermined flow volume of filtered gray water and including ultraviolet radiation generation means for irradiating with ultraviolet radiation said predetermined flow volume of said filtered gray water for at least a minimum predetermined time; and
   means for dividing said flow of said filtered gray water into a plurality of said predetermined flow volumes, said dividing means defining means for 1) directing said flow to a first module means until said first module means receives said predetermined flow volume equal to said capacity before the next sequential module means receives said flow, and 2) directing said flow for said predetermined time only to a number of said module means, said number of said module means aggregate capacity substantially equal to said total volume.

7. The gray water processing system according to claim 6, further comprising:
   means, coupled to said plurality of said module means, for receiving and storing said irradiated gray water.

8. The gray water processing system according to claim 6, wherein each of said module means further comprises:
   sensing means for detecting said flow of said filtered gray water into and through each of said module means; and
   means responsive to said sensing means for activating said ultraviolet radiation generation means.

9. The gray water processing system according to claim 1, wherein each of said module means further comprises:
   means for deactivating said radiation generation means when said sensing means does not detect said flow of said filtered gray water.

10. The gray water processing system as in claim 6, wherein each of said module means comprises:
    an outer hollow tube having a first cross-sectional area;

an inner hollow tube, composed of a material which is substantially transparent to ultraviolet radiation, disposed within said outer hollow tube and having a smaller cross-sectional area than said first cross-sectional area thereby forming a space between an outer surface of said inner hollow tube and an inner surface of said outer hollow tube, and said space receiving said flow of said filtered gray water; and said ultraviolet radiation generation means disposed within said inner hollow tube.

11. The gray water processing system as in claim 10, wherein:
the outer hollow tube comprises an aluminum coated PVC tube.

12. The gray water processing system as in claim 10, wherein:
the inner hollow tube comprises a clear fused silica glass sheath.

* * * * *